No. 671,964.  
B. F. KEENEY.  
BOILER WASHOUT DEVICE.  
(Application filed Oct. 4, 1900.)  
Patented Apr. 16, 1901.
(No Model.)
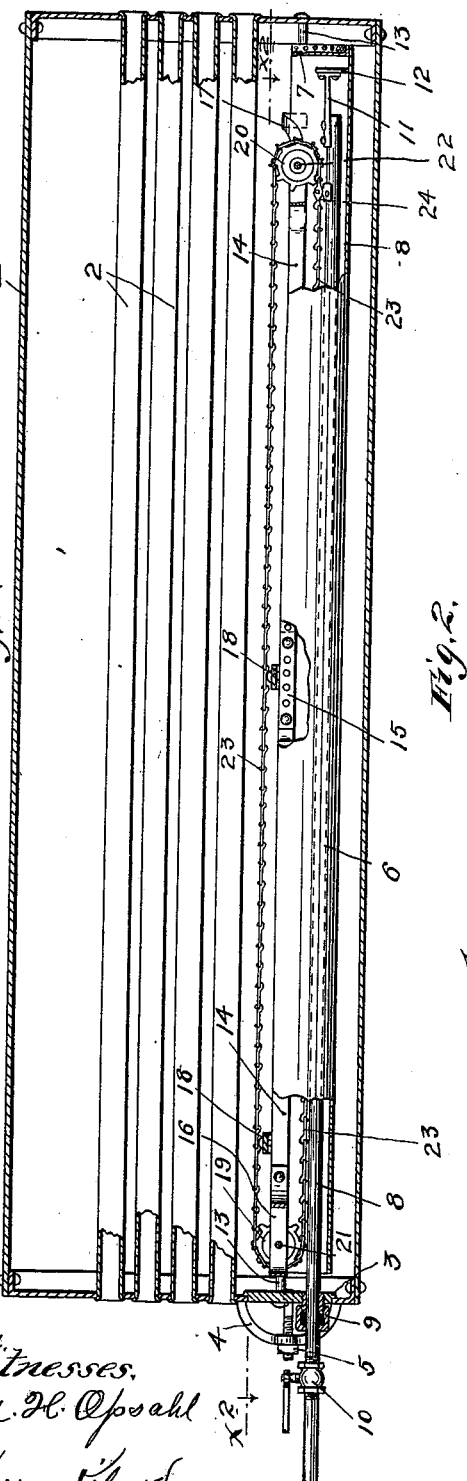
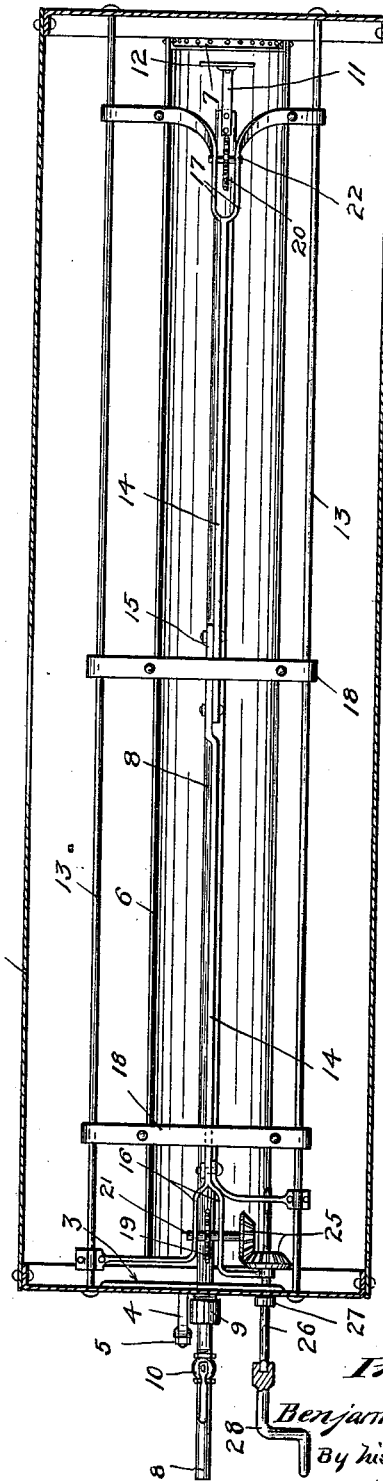
Witnesses.  
A. H. Opsahl  
Harry Kilgord
Inventor.  
Benjamin F. Keeney  
By his Attorneys.  
Williamson & Merchant.

UNITED STATES PATENT OFFICE.

BENJAMIN F. KEENEY, OF WATERTOWN, SOUTH DAKOTA.

BOILER-WASHOUT DEVICE.

SPECIFICATION forming part of Letters Patent No. 671,964, dated April 16, 1901.

Application filed October 4, 1900. Serial No. 31,949. (No model.)

*To all whom it may concern:*

Be it known that I, BENJAMIN F. KEENEY, a citizen of the United States, residing at Watertown, in the county of Codington and State of South Dakota, have invented certain new and useful Improvements in Boiler-Washout Devices; and I do hereby declare the following to be a full, clear, and exact description of the invention, such as will enable others skilled in the art to which it appertains to make and use the same.

My present invention has for its object to provide an improved boiler-washout device; and to this end it consists of the novel devices and combinations of devices hereinafter described, and defined in the claims.

The invention is illustrated in the accompanying drawings, wherein like characters indicate like parts throughout both views.

Figure 1 is a vertical section taken centrally through a horizontal boiler equipped with one of my improved washout devices, some parts being shown in full and others being broken away. Fig. 2 is a horizontal section approximately on the line $x^2 x^2$ of Fig. 1, the flues being removed to more clearly show the mechanism below the same.

The numeral 1 indicates an ordinary horizontal boiler having flues 2 in the ordinary arrangement and provided at one end with an ordinary manhole-cover 3, held in the ordinary way by yoke 4 and nutted bolt 5.

In my present invention I preferably employ a horizontal catch-trough, which is advisably a separate part, but which may nevertheless be formed integral with or as a part of the bottom of the boiler. This trough in its preferred arrangement is indicated by the numeral 6, and it is shown as provided at one end with a head 7.

The discharge-pipe 8 works through a stuffing-box 9, which is shown as applied to manhole-cover 3, and said pipe is shown as provided at a point exterior of the boiler with a valve 10. The inner portion of the discharge-pipe 8 extends longitudinally of the trough 6, close to its bottom, and at its open inner end it is provided with a projecting finger 11, to which a scraper 12 is attached. The scraper 12 fits the bottom of the trough; but preferably it does not extend to the top of the same.

The numeral 13 indicates a pair of supporting-rods extended longitudinally through the boiler and secured to the heads thereof. A supporting-bracket 14, the sections of which are shown as adjustably secured at 15, is provided with pronged heads 16 and 17, that are secured to the supporting-rods 13. The trough 6 is suspended from the rods 13 by cross-bars 18 and by the prongs of the bracket-head 17. A pair of sprockets 19 and 20 are suitably mounted, the former, as shown, having a shaft 21, mounted in the prongs of the head 16, and the latter having a short shaft 22, mounted in the prongs of the head 17, both sprockets being located vertically over the discharge-pipe 8. The sprocket-chain 23 runs over the sprockets 19 and 20, and one link thereof is pivotally connected, as shown at 24 in Fig. 1, to the inner end of the discharge-pipe 8. One member of a pair of bevel-gears 25 is secured on the shaft 21 of the sprocket 19. The other member of said gears is secured on the short shaft 26, which is suitably mounted in the prongs of the bracket-head 16 and works outward through the small stuffing-box 27, which, as shown, is also applied to the manhole-cover 3. As shown, the shaft 26 is formed at its outer end with a squared shank, to which a detachable hand-crank 28 is adapted to be applied, as shown in Fig. 2.

One of the main objects of my present invention is to provide simple and efficient means whereby the discharge-tube may be moved longitudinally of the boiler with a positive action in both directions, and this I have accomplished, as is obvious from the foregoing description.

By turning the crank 28 in the one direction or the other the sprocket-chain 23 may be driven in either direction, so as to positively move the open inner end of the discharge-tube 8 in either direction longitudinally of the trough 6. Hence the discharge-tube may be given its desired movements whether or not there be steam-pressure in the boiler.

To wash out the boiler, the valve 10 of the discharge-pipe 8 is open and the said pipe is moved slowly back and forth, as above indicated. Under this movement of the discharge-tube the scraper 12 stirs up the sediment and causes the same to be carried off through the discharge-tube with the water.

It will of course be understood that the invention above described is capable of considerable modification.

What I claim, and desire to secure by Letters Patent of the United States, is as follows:

1. The combination with a boiler having a manhole in one end located below the water-line and having a detachable manhole-cover, of a discharge-pipe working longitudinally through said manhole-cover and removable therewith through said manhole, substantially as described.

2. The combination with a boiler having a manhole-cover in one end located below the water-level and having a detachable manhole-cover, of a discharge-pipe working longitudinally through said manhole-cover and provided at its inner end with a scraper, which discharge-pipe, together with said scraper, is removable with said manhole-cover and through said manhole, substantially as described.

In testimony whereof I affix my signature in presence of two witnesses.

BENJAMIN F. KEENEY.

Witnesses:
ANNE S. READ,
F. D. MERCHANT.